(12) United States Patent
Lv et al.

(10) Patent No.: US 8,547,928 B2
(45) Date of Patent: Oct. 1, 2013

(54) MULTI-SUBFRAME SCHEDULING METHOD, MULTI-SUBFRAME SCHEDULING SYSTEM, TERMINAL, AND BASE STATION

(75) Inventors: Yongxia Lv, Beijing (CN); Xiaoan Fan, Beijing (CN); Bo Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 66 days.

(21) Appl. No.: 13/302,387

(22) Filed: Nov. 22, 2011

(65) Prior Publication Data

US 2012/0127938 A1 May 24, 2012

Related U.S. Application Data

(63) Continuation of application No. PCT/CN2009/071940, filed on May 22, 2009.

(51) Int. Cl.
*H04W 4/00* (2009.01)
(52) U.S. Cl.
USPC ............................. 370/330; 370/328; 370/329
(58) Field of Classification Search
USPC ................. 370/252, 254, 280, 310, 315, 328, 370/329, 338, 343, 345, 509
See application file for complete search history.

(56) References Cited

U.S. PATENT DOCUMENTS

| | | |
|---|---|---|
| 2005/0220068 A1 | 10/2005 | Kim et al. |
| 2008/0192702 A1 | 8/2008 | Song et al. |
| 2010/0027447 A1* | 2/2010 | Choi et al. ..................... 370/280 |
| 2010/0195587 A1* | 8/2010 | Ratasuk et al. ............... 370/329 |
| 2012/0113794 A1* | 5/2012 | Roman et al. ................. 370/201 |

FOREIGN PATENT DOCUMENTS

| | | |
|---|---|---|
| CN | 1953350 A | 4/2007 |
| CN | 101242207 A | 8/2008 |
| CN | 101287281 A | 10/2008 |
| CN | 101400081 A | 4/2009 |
| WO | WO 2008/024578 A2 | 2/2008 |
| WO | WO 2008/127015 A1 | 10/2008 |
| WO | WO 2008/127038 A1 | 10/2008 |
| WO | WO 2008127038 A1 * | 10/2008 |
| WO | WO 2009/022294 A2 | 2/2009 |
| WO | WO 2009/022309 A2 | 2/2009 |

OTHER PUBLICATIONS

International Search Report received in the Patent Cooperation Treaty Application No. PCT/CN2009/071940, mailed Feb. 25, 2010, 4 pages.
Written Opinion of the International Searching Authority received in Patent Cooperation Treaty Application No. PCT/CN2009/071940, mailed Feb. 25, 2010, 3 pages.
Supplementary European Search Report received in European Patent Application No. 09844795.6, mailed Mar. 23, 2012, 8 pages.
First Chinese Office Action of Chinese Application No. 200980101680.3 mailed Jun. 5, 2012, 11 pages. (Partial Translation).
Second Office Action of Chinese Application No. 200980101680.3 mailed Mar. 25, 2013, 16 pages. (Partial Translation).

* cited by examiner

*Primary Examiner* — Chandrahas Patel
*Assistant Examiner* — Kabir Jahangir
(74) *Attorney, Agent, or Firm* — Slater & Matsil, L.L.P.

(57) ABSTRACT

A multi-subframe scheduling method includes receiving Physical Downlink Control Channel (PDCCH) information which is sent by a base station and includes time domain resource indication information. The time domain resource indication information is used to indicate information of multiple subframes scheduled by the PDCCH information. Data is transmitted and received, according to the PDCCH information, on the multiple subframes scheduled by the PDCCH information.

14 Claims, 2 Drawing Sheets

```
Receive PDCCH information which is sent by a base
station and includes time domain resource indication
information, where the time domain resource indication      ~101
information is used to indicate information of multiple
subframes scheduled by the PDCCH information

↓

Transmit and receive, according to the PDCCH
information, data on the multiple subframes scheduled       ~102
by the PDCCH information
```

MULTI-SUBFRAME SCHEDULING METHOD, MULTI-SUBFRAME SCHEDULING SYSTEM, TERMINAL, AND BASE STATION

This application is a continuation of International Application No. PCT/CN2009/071940, filed on May 22, 2009, which is hereby incorporated by reference in this entirety.

TECHNICAL FIELD

The present invention relates to the field of communications, and in particular to a multi-subframe scheduling method, a multi-subframe scheduling system, a terminal, and a base station.

BACKGROUND

In a 3rd Generation Partnership Project (3rd Generation Partnership Project, 3GPP) Long Term Evolution (Long Term Evolution, LTE) system, a base station bears resource block indication information and resource scheduling indication information including Physical Downlink Shared CHannel (Physical Downlink Shared Channel, PDSCH) modulation and coding scheme through the Physical Downlink Control CHannel (Physical Downlink Control Channel, PDCCH). Specifically, the PDCCH bears the downlink control signaling and uplink control signaling that are oriented to each User Equipment (User Equipment, UE) and the common control signaling oriented to all UEs in a cell, including paging information resource indication, system information resource indication, and Random Access CHannel (Random Access Channel, RACH) response information indication.

In different transmission modes, different Downlink Control Information (Downlink Control Information, DCI) formats may be adopted to transmit PDCCH information. Different DCI formats may be differentiated through the number of information bits or a format indication field. A UE obtains PDCCH information corresponding to a UE ID through procedures of Cyclic Redundancy Check (Cyclic Redundancy Check, CRC) and blind detection, and further obtains the position of a subframe scheduled by the PDCCH information and other transmission configuration information.

In the LTE system, the subframe scheduled by the PDCCH information is a subframe that bears the PDCCH information. That is to say, the prior art is single-subframe scheduling. Taking a 1.4 MHz low bandwidth system in the LTE as an example, the PDCCH information may occupy the first 2, 3, or 4 Orthogonal Frequency Division Multiplexing (Orthogonal Frequency Division Multiplexing, OFDM) symbols of each subframe for the transmission of downlink control signaling. When the PDCCH information may occupy the first two OFDM symbols of each subframe, the number of available Control Channel Elements (Control Channel Elements, CCEs) in a two-antenna transmission mode is 2, and the number of available CCEs in a four-antenna transmission mode is 1. When the PDCCH information may occupy the first three OFDM symbols of each subframe, the number of available CCEs in a two-antenna transmission mode is 4, and the number of available CCEs in a four-antenna transmission mode is 3. When the PDCCH information may occupy the first four OFDM symbols of each subframe, the number of available CCEs in a two-antenna transmission mode is 6, and the number of available CCEs in a four-antenna transmission mode is 5.

Generally, the paging information resource indication, system information resource indication, and RACH response information indication in the PDCCH information need to occupy 4 or 8 CCEs. In the case that this resource indication information exists, the number of CCEs used for UE resource scheduling is not larger than 2. That is, only a few PDCCH resources are used for UE resource scheduling. Because a newly-transmitted data packet and a part of the retransmitted data packet of the dynamic resource scheduling of each UE on each subframe require corresponding downlink scheduling authorized PDCCH or uplink scheduling authorized PDCCH, if only a few PDCCH resources are used for UE resource scheduling, the number of schedulable UEs is affected.

SUMMARY OF THE INVENTION

Embodiments of the present invention provide a multi-subframe scheduling method, a multi-subframe scheduling system, a terminal, and a base station, so as to save resources occupied by control signaling.

An embodiment of the present invention provides a multi-subframe scheduling method. PDCCH information which is sent by a base station and includes time domain resource indication information is received. The time domain resource indication information is used to indicate information of multiple subframes scheduled by the PDCCH information. Data is transmitted and received according to the PDCCH information data on the multiple subframes scheduled by the PDCCH information.

An embodiment of the present invention provides a terminal. An information receiving module is configured to receive PDCCH information which is sent by a base station and includes time domain resource indication information. The time domain resource indication information is used to indicate information of multiple subframes scheduled by the PDCCH information. A data transceiver module is configured to transmit and receive, according to the PDCCH information, data on the multiple subframes scheduled by the PDCCH information.

An embodiment of the present invention provides a base station. An information sending module is configured to send PDCCH information that includes time domain resource indication information. The time domain resource indication information is used to indicate information of multiple subframes scheduled by the PDCCH information. A data transceiver module is configured to transmit and receive data on the multiple subframes scheduled by the PDCCH information.

An embodiment of the present invention provides a multi-subframe scheduling system. A terminal is configured to receive PDCCH information which is sent by a base station and includes time domain resource indication information, and to transmit and receive, according to the PDCCH information, data on multiple subframes scheduled by the PDCCH information, where the time domain resource indication information is used to indicate information of the multiple subframes scheduled by the PDCCH information. The base station is configured to send the PDCCH information to the terminal and transmit data to and receive data from the terminal.

In the embodiments of the present invention, the PDCCH information that includes the time domain indication information schedules multiple subframes, and according to the PDCCH information, a UE may transmit and receive data on the multiple subframes, which saves the resources occupied by control signaling and increases the number of schedulable UEs in a specific network resource condition.

DETAILED DESCRIPTION OF ILLUSTRATIVE EMBODIMENTS

The technical solutions in the embodiments of the present invention are further described in detail with reference to the accompanying drawings and embodiments.

Figure 1:
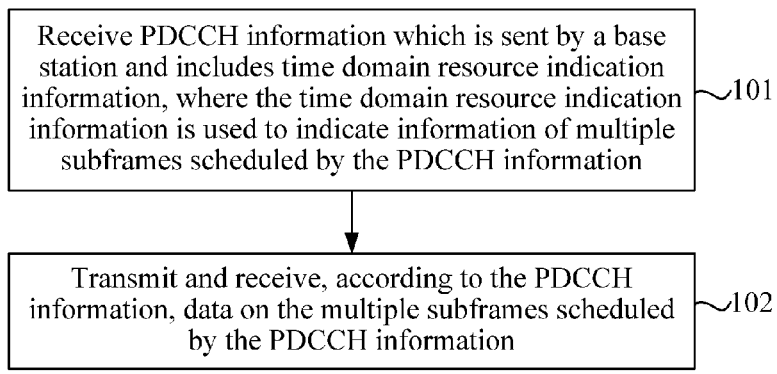
FIG. 1 is a flow chart of a multi-subframe scheduling method according to Embodiment 1 of the present invention.

FIG. 1 is a flow chart of a multi-subframe scheduling method according to Embodiment 1 of the present invention. As shown in FIG. 1, this embodiment specifically includes the following steps.

Step 101: Receive PDCCH information which is sent by a base station and includes time domain resource indication information, where the time domain resource indication information is used to indicate information of multiple subframes scheduled by the PDCCH information, where the multiple subframes are at least two subframes.

Step 102: Transmit and receive, according to the PDCCH information, data on the multiple subframes scheduled by the PDCCH information.

In this embodiment, the PDCCH information which is received and includes the time domain indication information schedules multiple subframes, which saves resources occupied by control signaling, and increases the number of schedulable UEs in a specific network resource condition.

Figure 2:
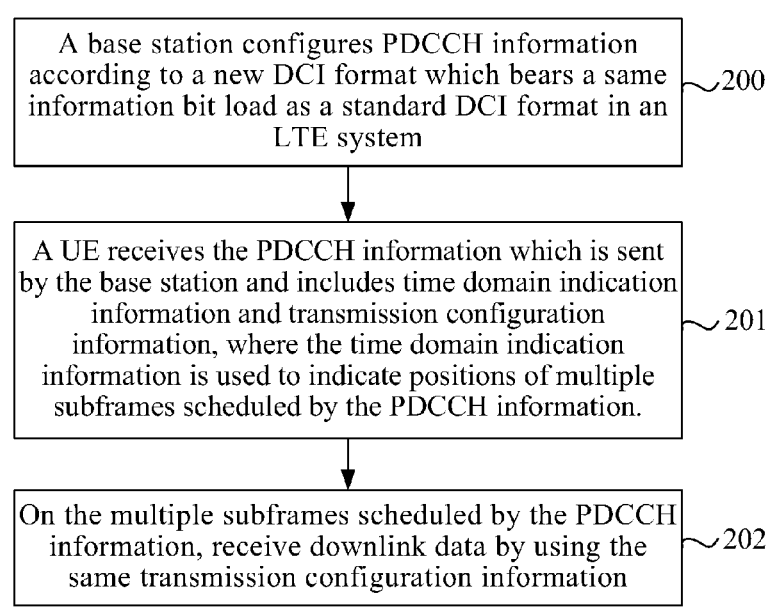
FIG. 2 is a flow chart of a multi-subframe scheduling method according to Embodiment 2 of the present invention.

FIG. 2 is a flow chart of a multi-subframe scheduling method according to Embodiment 2 of the present invention. This embodiment is described by taking the multi-subframe scheduling in a downlink data transmission process as an example. As shown in FIG. 2, this embodiment specifically includes the following steps.

Step 200: A base station configures PDCCH information according to a new DCI format which bears a same information bit load as a standard DCI format in an LTE system.

Step 201: A UE receives the PDCCH information which is sent by the base station and includes time domain indication information and transmission configuration information, where the time domain indication information is used to indicate positions of multiple subframes scheduled by the PDCCH information.

Step 202: On the multiple subframes scheduled by the PDCCH information, receive downlink data by using the same transmission configuration information.

In step 200, the base station uses the new DCI format to configure the PDCCH information. The new DCI format may be a variation of the standard DCI format in the LTE system, where the standard DCI format may be any one of the ten DCI formats in an LTE R8 system, the ten DCI formats include DCI format 0, DCI format 1, DCI format 1A, DCI format 1B, DCI format 1C, DCI format 1D, DCI format 2, DCI format 2A, DCI format 3, and DCI format 3A. Taking the DCI format 1A in a 1.4 MHz system as an example, a variation on the basis of the DCI format 1A forms the new DCI format as shown in Table 1.

TABLE 1

Schematic table of a new DCI format

| Field Name | Occupied Information Bit |
|---|---|
| DCI format differentiation field | 1 |
| Centralized or distributed transmission field | 1 |
| Time domain resource indication field | 5 |
| Modulation and coding level field | 5 |
| HARQ process number field | 4 |
| New data indication field | 1 |
| Redundancy version indication field | 2 |
| Power control command word field | 2 |
| CRC field | 16 |
| Additional bit field | 0 |
| Total | 39 |

If the PDCCH information is configured by using the new DCI format as shown in Table 1, the PDCCH information includes DCI format differentiation information borne by the DCI format differentiation field, centralized type or distributed type transmission information borne by the centralized or distributed transmission field, time domain resource indication information borne by the time domain resource indication field, modulation and coding level information borne by the modulation and coding level field, HARQ process number information borne by the HARQ process number field, new data indication information borne by the new data indication field, redundancy version indication information borne by the redundancy version indication field, power control command word information borne by the power control command word field, CRC information borne by the CRC field, and additional bit information borne by the additional bit field. The centralized or distributed transmission information and time domain resource indication information may be described as resource configuration information; and the modulation and coding level information, HARQ process number information, new data indication information, redundancy version indication information, and power control command word information may be jointly described as transmission configuration information.

The multi-subframe joint scheduling where all frequency domains are allocated to one user may notify the UE of the start or cancellation of a configuration procedure of the multi-subframe scheduling through high-layer signaling or other physical layer signaling.

It can be known from Table 1 that, in the new DCI format in this embodiment, the frequency domain resource indication field in the standard DCI format is reused to carry the time domain resource indication information. That is to say, the five bits occupied by the frequency domain resource indication field in the existing DCI format 1A are used as the time domain resource indication field. That is, the PDCCH information received by the UE in step 201 includes the time domain resource indication information but no longer includes the frequency domain resource indication information. In this embodiment, by using a timeslot or a subframe as a unit, all frequency domain resources of one timeslot or subframe are allocated to one UE for data transmission.

It should be noted that this embodiment is not limited to using the five bits occupied by the frequency domain resource indication field in the existing DCI format 1A as the time domain resource indication field. The bits occupied by another field in the existing DCI format 1A may also be used as the time domain resource indication field.

Between step 201 and step 202, this embodiment may include: The UE determines, according to the number of bits of the PDCCH information or the DCI format differentiation information included in the PDCCH information, the DCI format adopted by the PDCCH information.

Specifically, because the numbers of bits of the PDCCH information borne by different DCI formats may be different, the UE may determine, according to the number of bits of the PDCCH information, the DCI format adopted by the PDCCH information.

In this embodiment, the frequency domain resource indication field in the standard DCI format is redefined as a time domain resource indication field, but the number of bits occupied by the time domain resource indication field may be the same as the number of bits occupied by the frequency domain resource indication field, and other fields are not redefined. Therefore, the information bit load borne by the new DCI format may be the same as that borne by the standard DCI format. In other words, the new DCI format may bear the same number of information bits as the standard DCI format. In this way, compared with the prior art, the complexity of the blind detection process executed subsequently is not increased. In this case, the DCI format adopted by the PDCCH information may be determined through the DCI format differentiation information.

Between step 201 and step 202, this embodiment may further include: The UE obtains the time domain resource indication information and transmission configuration information in the PDCCH information through the blind detection method.

The time domain resource indication information obtained in this step is used to indicate positions of more than two subframes scheduled by the PDCCH information. Specifically, the time domain resource indication information may indicate the positions of the more than two subframes scheduled by the PDCCH information through a bitmap mapping mode or another mapping mode.

For example, in a downlink transmission process, suppose that the obtained PDCCH time domain resource indication information of the current subframe is "01100". When the bitmap mapping mode is used for indication, the first bit of the time domain resource indication information corresponds to the first subframe following the current subframe where the PDCCH is located, where 0 may indicate that the PDCCH does not schedule the subframe, and 1 indicates that the transmission or resource indication of the subframe is performed according to the indication of the PDCCH. As described above, the time domain resource indication information of the PDCCH indicates that the current PDCCH schedules the second and the third subframes following the current subframe and the subframe where the PDCCH is located.

Because each data packet corresponds to a different HARQ process, in the downlink transmission process, the HARQ process numbers corresponding to data packets in different subframes may be obtained according to the HARQ process number field and the time domain resource indication field that are in the PDCCH received by the UE.

For example, suppose that the obtained PDCCH time domain resource indication information of the current subframe is "01100". When the bitmap mapping mode is used for indication, if the HARQ process number field in the PDCCH of the current subframe is 2, the HARQ process number corresponding to the current subframe of the UE is 2. For other subframes jointly scheduled by the PDCCH, the HARQ process number ascends according to the time domain scheduling indication. Specifically, the HARQ process number of the second subframe following the current subframe scheduled by the PDCCH is 3 and the HARQ process number of the third subframe following the current subframe is 4.

In this embodiment, the fields other than the time domain resource indication field in the new DCI format may be the same as the DCI format of the existing single-subframe scheduling. In this way, during multi-subframe scheduling, all subframes scheduled by the PDCCH information of one subframe adopt the same transmission configuration information. For example, all subframes scheduled by the PDCCH information of one subframe adopt the modulation and coding level information, HARQ process number information, new data indication information, redundancy version indication information, and power control command word information that are borne by the DCI format shown in Table 1. That is to say, the jointly scheduled multiple subframes all adopt the same transmission configuration information as the subframe where the PDCCH information is located. In this way, the PDCCH information of one subframe may schedule multiple subframes that bear a newly-transmitted packet or multiple subframes that bear a retransmitted packet, but multiple subframes that bear both the newly-transmitted packet and the retransmitted packet cannot be scheduled through the PDCCH information of one subframe.

In step 202, on the subframes scheduled by the PDCCH information, the UE receives downlink data by using the same transmission configuration information as the subframe where the PDCCH information is located.

Figure 3:
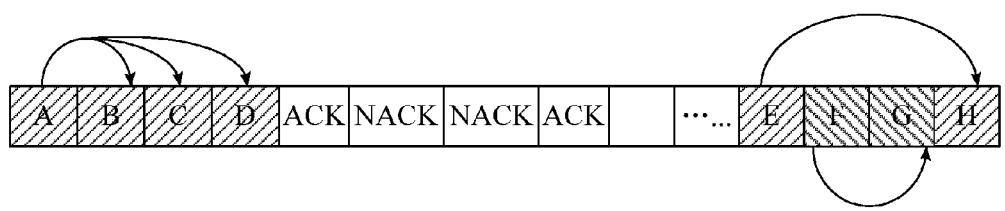
FIG. 3 is a schematic diagram of multi-subframe joint scheduling in the multi-subframe scheduling method according to Embodiment 2 of the present invention.

The technical solution of this embodiment is described through a specific example in the following. FIG. 3 is a schematic diagram of multi-subframe joint scheduling in a multi-subframe scheduling method according to Embodiment 2 of the present invention. As shown in FIG. 3, a downlink subframe A bears PDCCH information for multi-subframe joint scheduling. A UE determines a DCI format adopted by the PDCCH information and obtains the PDCCH information borne over the subframe A through a blind detection method to know that the PDCCH information schedules four continuous downlink subframes including subframe A in total, namely, subframes A, B, C, and D, and time domain resource positions and other transmission configuration information that are of these subframes. Then the UE receives downlink data over the subframes A, B, C, and D according to the transmission configuration information.

When an error occurs on a part of data packets in the multiple subframes scheduled by the PDCCH information and the error data packets need to be retransmitted, a base station needs to send PDCCH information with respect to the newly-transmitted packets and the retransmitted packets respectively for joint scheduling. As shown in FIG. 3, subframes E and H need to receive a new packet and the subframe E bears the PDCCH information that schedules the subframes E and H; and subframes F and G need to receive retransmitted packets and the subframe F bears the PDCCH information that schedules the subframes F and G.

Because the data packet corresponding to each subframe of the UE needs to correspond to an independent HARQ process number, the joint scheduling of the subframes also needs to obtain, according to the HARQ process number information transmitted in the PDCCH information, the HARQ process number corresponding to each subframe. The UE may obtain, according to the HARQ process number information borne in the PDCCH information, the HARQ process number corresponding to the first subframe, and then obtain, according to the time domain resource indication information, the HARQ process number corresponding to each subframe through calculation.

This embodiment provides that a variation is made to the existing DCI format 1A to form a new DCI format to bear the PDCCH information, but this embodiment is not limited to this. The PDCCH information may also be borne by a new DCI format formed through a variation of any standard DCI format in the LTE system to keep the same number of bits as the standard DCI format.

This embodiment realizes multi-subframe joint scheduling. That is, the resource configuration information and transmission configuration information of multiple subframes may be notified through the PDCCH information of one subframe. Specifically, the PDCCH information of one subframe received by the UE schedules multiple subframes, and, according to the PDCCH information of the one subframe, the UE may receive downlink data over multiple subframes by using the same transmission configuration information, which reduces the resources occupied by PDCCH information, namely, saves the resources occupied by control signaling, and increases the spectrum efficiency. In a specific network resource condition, the number of scheduled subframes is increased and further the number of schedulable UEs is increased. Because the new DCI format bears the same number of information bits as the standard DCI format, this embodiment avoids increasing the complexity of PDCCH detection performed by the UE. This multi-subframe scheduling method may also be applied to an uplink data transmission process.

Figure 4:
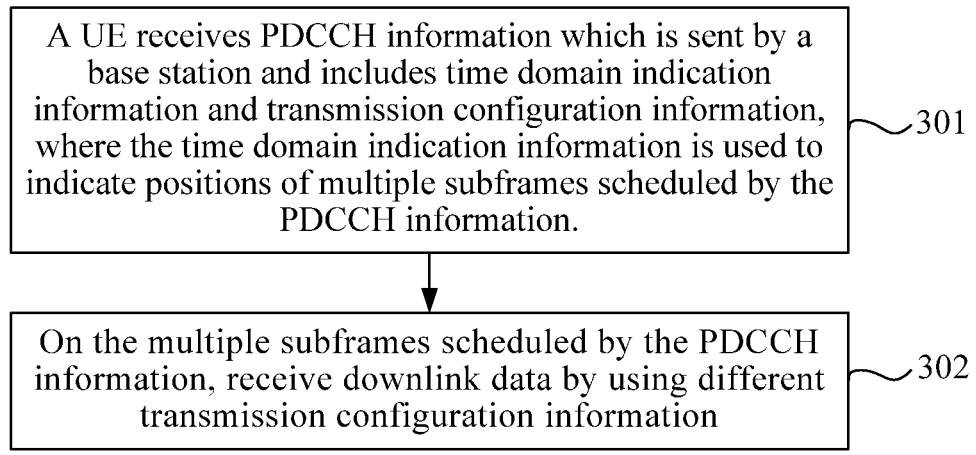
FIG. 4 is a flow chart of a multi-subframe scheduling method according to Embodiment 3 of the present invention.

FIG. 4 is a flow chart of a multi-subframe scheduling method according to Embodiment 3 of the present invention. This embodiment is described by taking the multi-subframe scheduling in a downlink data transmission process as an example. As shown in FIG. 4, this embodiment specifically includes the following steps:

Step 301: A UE receives PDCCH information which is sent by a base station and includes time domain indication information and transmission configuration information, where the time domain indication information is used to indicate positions of multiple subframes scheduled by the PDCCH information.

Step 302: On the multiple subframes scheduled by the PDCCH information, receive downlink data by using different transmission configuration information.

In step 301, the PDCCH information received by the UE is borne by another new DCI format, which is different from the new DCI format in Embodiment 2 in that: an independent transmission configuration field is set for each subframe in this new DCI format. That is to say, the new DCI format in this embodiment bears the different transmission configuration information of each subframe, and specifically, the new DCI format bears different modulation and coding level information, HARQ process number information, new data indication information, and redundancy version indication information of each subframe, and may bear same power control command word information of each subframe.

A time domain scheduling mode is adopted in a 1.4 MHz low bandwidth system, where all frequency domain resources of one subframe are allocated to one individual UE for data transmission by using a timeslot or a subframe as a unit.

Between step 301 and step 302, this embodiment may also include: The UE determines, according to the number of bits of the PDCCH information or the DCI format differentiation information included in the PDCCH information, a DCI format adopted by the PDCCH information; and the UE obtains the time domain resource indication information and transmission configuration information in the PDCCH information through a blind detection method.

It should be noted that, in this embodiment, a time domain resource indication field is defined in the new DCI format, and the time domain resource indication information borne by the time domain resource indication field indicates the positions of subframes scheduled by the PDCCH information through a bitmap mapping mode or another mapping mode. Furthermore, the PDCCH information includes the transmission configuration information of each schedulable subframe, where the transmission configuration information may include modulation and coding level information, HARQ process number information, new data indication information, redundancy version indication information, and power control command word information. Therefore, different transmission configuration information of the jointly scheduled multiple subframes may be obtained through the PDCCH information of one subframe, which increases the flexibility of data scheduling of the base station and improves the system performance through more flexible resource configuration. Further, because the multiple subframes scheduled by the PDCCH information of one subframe have respective independent new data packet indication information, in this embodiment, subframes bearing newly transmitted packets and retransmitted packets may be scheduled through the PDCCH information of one subframe. This multi-subframe scheduling method may also be applied to an uplink data transmission process.

Figure 5:
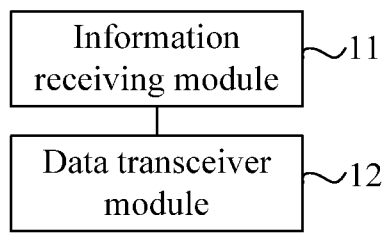
FIG. 5 is a schematic structure diagram of a terminal according to an embodiment of the present invention.

FIG. 5 is a schematic structure diagram of a terminal according to an embodiment of the present invention. As shown in FIG. 5, this embodiment specifically includes: an information receiving module 11 and a data transceiver module 12. The information receiving module 11 receives PDCCH information which is sent by a base station and includes time domain resource indication information, where the time domain resource indication information is used to indicate information of multiple subframes scheduled by the PDCCH information. The data transceiver module 12 transmits and receives, according to the PDCCH information, data on the multiple subframes scheduled by the PDCCH information.

The foregoing PDCCH information may also include transmission configuration information, and the data transceiver module 12 may be specifically configured to, on the multiple subframes scheduled by the PDCCH information, transmit and receive data by using the same transmission configuration information, and may also be specifically configured to, on the multiple subframes scheduled by the PDCCH information, transmit and receive data by using different transmission configuration information.

In this embodiment, the PDCCH information which is received and includes the time domain indication information schedules multiple subframes, which saves resources occupied by control signaling. The number of schedulable UEs is increased in a specific network resource condition.

Figure 6:
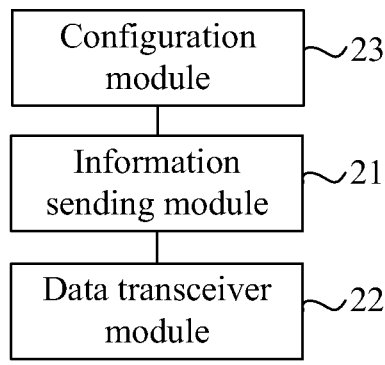
FIG. 6 is a schematic structure diagram of a base station according to an embodiment of the present invention.

FIG. 6 is a schematic structure diagram of a base station according to an embodiment of the present invention. As shown in FIG. 6, this embodiment specifically includes: an information sending module 21 and a data transceiver module 22. The information sending module 21 sends PDCCH information that includes time domain resource indication information which is used to indicate information of multiple subframes scheduled by the PDCCH information. The data transceiver module 22 transmits and receives data on the multiple subframes scheduled by the PDCCH information.

Further, this embodiment may also include a configuration module 23, configured to configure the PDCCH information according to a new DCI format which bears a same information bit load as a standard DCI format in an LTE system.

In this embodiment, the PDCCH information which is sent and includes time domain indication information schedules multiple subframes, which saves resources occupied by control signaling. The number of schedulable UEs is increased in a specific network resource condition.

Figure 7:
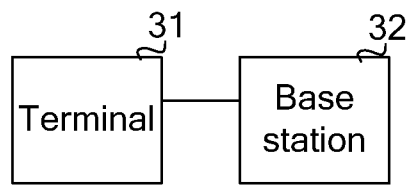
FIG. 7 is a schematic structure diagram of a multi-subframe scheduling system according to an embodiment of the present invention.

FIG. 7 is a schematic structure diagram of a multi-subframe scheduling system according to an embodiment of the present invention. As shown in FIG. 7, this embodiment includes a terminal 31 and a base station 32. The terminal 31 receives PDCCH information which is sent by the base station 32 and includes time domain resource indication information, where the time domain resource indication information is used to indicate information of multiple subframes scheduled by the PDCCH information; and transmits data to and receives data from the base station 32 on the multiple subframes scheduled by the PDCCH information according to the PDCCH information. The base station 32 sends the PDCCH information to the terminal 31 and transmits and receives data.

In this embodiment, the PDCCH information which is sent from the base station and received by the UE and includes the time domain indication information schedules multiple subframes, which saves resources occupied by control signaling. The number of schedulable UEs is increased in a specific network resource condition.

In addition, it should be noted that the embodiment of the present invention is not only applicable to the 1.4 MHz low bandwidth system in LTE, but also applicable to another system where the number of schedulable UEs is limited because of limited control signaling resources.

Those of ordinary skill in the art may understand that all or part of the steps in the foregoing method embodiments may be implemented through a program instructing relevant hardware. The program may be stored in a computer readable storage medium and when the program is executed, the steps in the foregoing method embodiments are executed. The storage medium includes any medium that may store program codes, such as a read-only memory (ROM), a random access memory (RAM), a magnetic disk or an optical disk.

Finally, it should be noted that the preceding embodiments are merely used to describe instead of limiting the technical solutions of the present invention. Although the embodiments of the present invention are described in detail with reference to the foregoing embodiments, it should be understood that: persons of ordinary skill in the art may still make modifications to the technical solutions described in the foregoing embodiments or equivalent replacements to a part of the technical characteristics. However, these modifications or replacements do not make the corresponding technical solutions deviate from the spirit and scope of the technical solutions in the embodiments of the present invention.

What is claimed is:

1. A multi-subframe scheduling method, comprising:
receiving Physical Downlink Control CHannel (PDCCH) information which is sent by a base station and comprises time domain resource indication information, wherein the time domain resource indication information is used to indicate information of multiple subframes scheduled by the PDCCH information; and
transmitting and receiving, according to the PDCCH information, data on the multiple subframes scheduled by the PDCCH information, wherein, the PDCCH information is configured by the base station according to a new Downlink Control Information (DCI) format, and a frequency domain resource indication field in a standard DCI format is reused in the new DCI format to carry the time domain resource indication information.

2. The multi-subframe scheduling method according to claim 1, wherein before the receiving PDCCH information which is sent by a base station and comprises time domain resource indication information, the method further comprises: configuring, by the base station, the PDCCH information according to a new Downlink Control Information format which bears a same information bit load as the standard DCI format in a Long Term Evolution system.

3. The multi-subframe scheduling method according to claim 1, wherein all frequency domain resources of the multiple subframes scheduled by the PDCCH information are allocated to a User Equipment that receives the PDCCH information.

4. The multi-subframe scheduling method according to claim 1, wherein before the receiving PDCCH information which is sent by a base station and comprises time domain resource indication information, the method further comprises: receiving a notification message transmitted through high-layer signaling or physical layer signaling, and the notification message is used to notify a User Equipment to start a configuration procedure of multi-subframe scheduling.

5. The multi-subframe scheduling method according to claim 1, wherein the time domain resource indication information is used to indicate positions of the multiple subframes scheduled by the PDCCH information.

6. The multi-subframe scheduling method according to claim 2, wherein the PDCCH information also comprises transmission configuration information, and the transmitting and receiving, according to the PDCCH information, data on the multiple subframes scheduled by the PDCCH information comprises: on the multiple subframes scheduled by the PDCCH information, transmitting and receiving data by using the same transmission configuration information.

7. The multi-subframe scheduling method according to claim 1, wherein the PDCCH information also comprises transmission configuration information, and the transmitting and receiving, according to the PDCCH information, data on the multiple subframes scheduled by the PDCCH information comprises: on the multiple subframes scheduled by the PDCCH information, transmitting and receiving data by using different transmission configuration information.

8. A terminal, comprising:
an information receiving module, configured to receive Physical Downlink Control CHannel (PDCCH) information which is sent by a base station and comprises time domain resource indication information, wherein the time domain resource indication information is used to indicate information of multiple subframes scheduled by the PDCCH information; and
a data transceiver module, configured to transmit and receive, according to the PDCCH information, data on the multiple subframes scheduled by the PDCCH information, wherein, the PDCCH information is configured by the base station according to a new Downlink Control Information (DCI) format, and a frequency domain resource indication field in a standard DCI format is reused in the new DCI format to carry the time domain resource indication information.

9. The terminal according to claim 8, wherein the PDCCH information also comprises transmission configuration information, and the data transceiver module is specifically configured to, on the multiple subframes scheduled by the PDCCH information, transmit and receive data by using the same transmission configuration information.

10. The terminal according to claim 8, wherein the PDCCH information also comprises transmission configuration information, and the data transceiver module is specifically configured to, on the multiple subframes scheduled by the PDCCH information, transmit and receive data by using different transmission configuration information.

11. A base station, comprising:
a configuration module, configured to configure Physical Downlink Control Channel (PDCCH) information according to a new Downlink Control Information (DCI) format, wherein a frequency domain resource indication field in a standard DCI format is reused in the new DCI format to carry a time domain resource indication information;
an information sending module, configured to send the PDCCH information that includes the time domain resource indication information, wherein the time domain resource indication information is used to indicate information of multiple subframes scheduled by the PDCCH information; and
a data transceiver module, configured to transmit and receive data on the multiple subframes scheduled by the PDCCH information.

12. The base station according to claim 11, further comprising a wherein the configuration module is specifically configured to configure the PDCCH information according to a the new DCI format which bears a same information bit load as the standard DCI format in a Long Term Evolution (LTE) system.

13. A multi-subframe scheduling system, comprising:
a terminal, configured to receive Physical Downlink Control CHannel (PDCCH) information which is sent by a base station and comprises time domain resource indication information, and transmit and receive, according to the PDCCH information, data on multiple subframes scheduled by the PDCCH information, wherein the time domain resource indication information is used to indicate information of the multiple subframes scheduled by the PDCCH information; and
the base station, configured to configure the PDCCH information according to a new Downlink Control Information (DCI) format, wherein a frequency domain resource indication field in a standard DCI format is reused in the new DCI format to carry the time domain resource indication information, and to send the PDCCH information to the terminal and transmit data to and receive data from the terminal.

14. A non-transitory computer-readable storage medium with an executable program stored thereon, wherein the program instructs a computer unit to perform the steps of claim 1.

* * * * *

UNITED STATES PATENT AND TRADEMARK OFFICE
CERTIFICATE OF CORRECTION

PATENT NO. : 8,547,928 B2
APPLICATION NO. : 13/302387
DATED : October 1, 2013
INVENTOR(S) : Lv et al.

It is certified that error appears in the above-identified patent and that said Letters Patent is hereby corrected as shown below:

In the Claims

Col. 11, line 24, claim 12, delete "further comprising a".
Col. 12, line 1, claim 12, delete "a the new" and insert --the new--.

Signed and Sealed this
Twelfth Day of November, 2013

Teresa Stanek Rea
*Deputy Director of the United States Patent and Trademark Office*